(No Model.)
D. S. PEMBROKE.
TWO WHEELED VEHICLE.
No. 378,335. Patented Feb. 21, 1888.
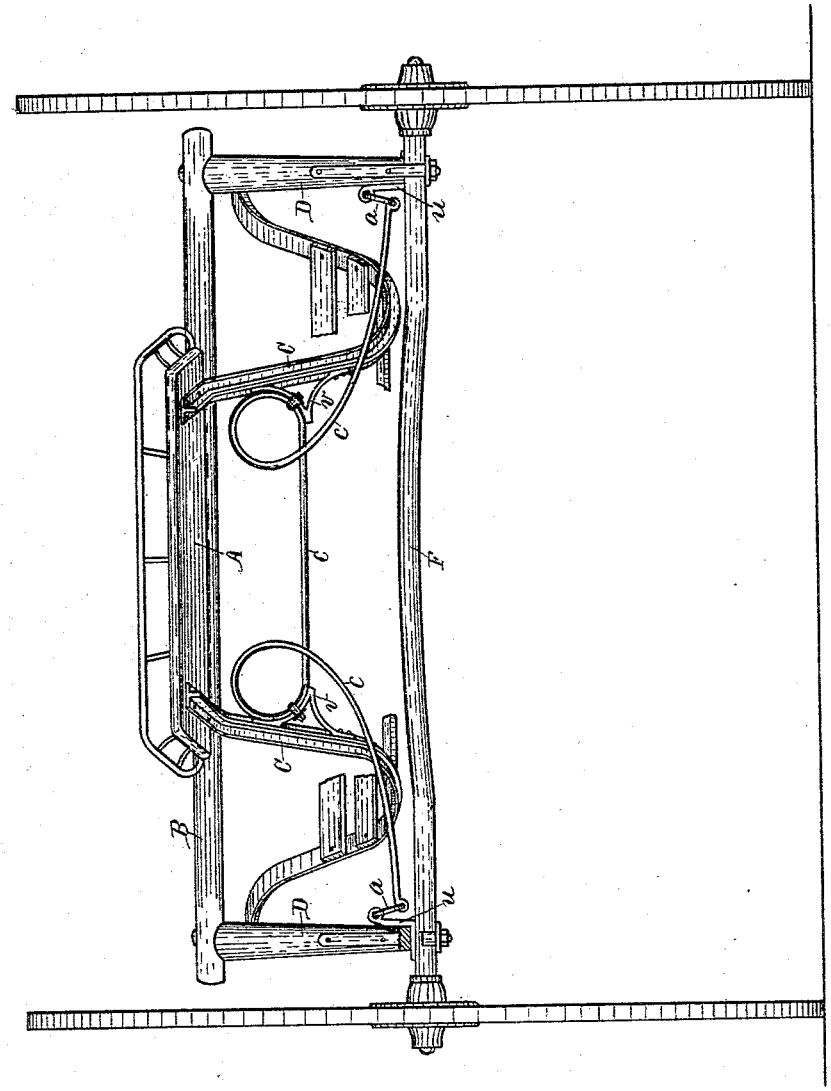
Witnesses.
John C Perkins
John Reidsema
Inventor.
Daniel S. Pembroke.
By Lucius C. West.
atty.

UNITED STATES PATENT OFFICE.

DANIEL S. PEMBROKE, OF KALAMAZOO, MICHIGAN.

TWO-WHEELED VEHICLE.

SPECIFICATION forming part of Letters Patent No. 378,335, dated February 21, 1888.

Application filed October 26, 1887. Serial No. 253,406. (No model.)

*To all whom it may concern:*

Be it known that I, DANIEL S. PEMBROKE, a citizen of the United States, residing at Kalamazoo, county of Kalamazoo, State of Michigan, have invented a new and useful Two-Wheeled Vehicle, of which the following is a specification.

This invention relates to the ordinary style of two-wheeled vehicles in which the seat-bars or body are fulcrumed at the forward end and elastically supported over the axle; and it has for its object a peculiar construction of the elastic support and its association with other parts, substantially as set forth in the following description and claims.

In the drawing forming a part of this specification is shown the vehicle in rear elevation, parts being broken away.

Referring to the lettered parts of the drawing, D are the thills; B, the thill cross-bar; C, the seat-bars or body supporting the seat A, and F the wheeled axle, all as disclosed in the prior state of the art.

The spring c is made from a bar of elastic metal bent so as to form two separated loops, which loops are connected by a portion of said bar, and from said loops the ends of the bar are extended laterally in opposite directions from each other. There are various ways in which such a spring may be employed to support the body of different classes of vehicles, and if employed in a four-wheeled vehicle, which I reserve the right of doing, more than one spring may be used; but, as here shown, the loops of the spring, in general terms, are attached one to each seat-bar C, below the seat, and the free ends are attached, either directly or indirectly, (the latter in this instance,) to the axle F near the wheels. For convenience the outer bar of these loops is clipped to the brackets *v v*, which project inwardly from the seat-bars C, and the ends of the spring are linked at *a* to the end of the eyed bars *u*. The ends of the spring may be attached to the rear portion of the thills, or to any other suitable support.

It will be observed that, as here shown, that portion of the spring which connects the two loops forms a stay-brace to the seat-bars above the foot-slats. When the body is borne downward by the weight of the rider, the loops of the spring are contracted and the laterally-extended ends are forced outward toward the thills. The spring made in this form is very easy to manufacture, and when thus associated with the seat-bars is quite ornamental, and in a measure closes the space above the foot-slats.

Having thus described my invention, what I claim as new is—

1. A vehicle-spring made from an elastic bar bent so as to form the separated loops, having a portion of the bar connecting them and the free ends of the bar extended from the loop laterally in opposite directions, substantially as set forth.

2. The combination of a vehicle-body fulcrumed at the forward end, the axle, thills, and a spring bent so as to form the loops, with a portion of the spring connecting said loops, the latter being attached to the body, the ends of the spring being extended from the loops toward the wheels and attached to suitable supports, substantially as set forth.

3. The combination of the fulcrumed seat-bars provided with the brackets, the spring having its loops attached to said brackets, and the free ends of said spring supported by the axle, substantially as set forth.

4. The combination of the seat-bars, the axle, and the spring having a loop attached to each seat-bar, with a portion of the spring connecting said loop, and also serving as a stay-brace to the seat-bars, substantially as set forth.

In testimony of the foregoing I have hereunto subscribed my name in presence of two witnesses.

DANIEL S. PEMBROKE.

Witnesses:
RUFUS SCOTT,
H. J. OGDEN.